Nov. 7, 1967  M. E. TILLANDER ETAL  3,351,025
BAKING OVEN
Filed Sept. 27, 1965

Inventors
Magnus Emanuel Tillander
Ake Bernhard Persson
Leif Arve Tore Johansson
By Roy E. Petherbridge
Atty

United States Patent Office 3,351,025
Patented Nov. 7, 1967

3,351,025
BAKING OVEN
Magnus Emanuel Tillander and Ake Bernhard Persson, Vallingby, and Arve Tore Johansson, Huddinge, Sweden, assignors to Ti-Pe Elmeko, Stockholm, Sweden, a partnership of Sweden
Filed Sept. 27, 1965, Ser. No. 490,259
Claims priority, application Sweden, Oct. 5, 1964, 11,951/64
3 Claims. (Cl. 107—55)

This invention relates to baking ovens of the type having one or more parallelepipedal baking chambers disposed side by side through which circulating hot air is forced by a fan and in which the dough pieces lie on baking-plates during the baking.

Baking ovens of this general type have many advantages over traveling ovens, for example. However, since the dough pieces are immobile during the baking it is difficult to achieve a uniform baking of the dough pieces. The circulating hot air, which brings about the baking of the dough pieces, is passed from the fan into the or each baking chamber through openings in the one side-wall thereof and is allowed to flow between the baking-plates (which lie one above the other) so as to touch the dough pieces and transfer heat thereto and is finally discharged from the baking chamber through openings in the other side-wall thereof and passed back to the fan. During its circulation through the oven the air is heated in a heater. Since the air cools gradually during its flow through the baking chamber from the inlet wall towards the discharge wall the dough pieces situated near the discharge wall will, if the direction of flow is always the same, be subjected to a lower temperature than the dough pieces situated near the inlet wall.

This drawback can be eliminated if the direction of flow is reversed repeatedly during the baking, i.e. if the hot air is allowed to pass through the baking chamber in the one direction for a period and then induced to pass through the baking chamber in the opposite direction for the same period.

Various means for reversing the circulation are known. In one device for this purpose the fan housing has a special shape and is rotatably mounted in the oven, the reversing being effected by rotating the housing between two positions. This device is advantageous in that it requires hardly no more space than a conventional fan housing. However, the specially shaped fan housing is complicated and its rotation requires a considerable effort. An even greater disadvantage resides in the fact that the direction of flow is reversed at the heater also, and therefore it is difficult to maintain a desired temperature of the air leaving the heater.

Another known device comprises a duct cross in the air path. A first and a second duct of this duct cross lead each to one side of the baking chamber while a third duct is connected to the outlet of the fan and houses the heater and the fourth duct is connected to the inlet of the fan. The duct cross houses a two-position valve which in its one position directs the hot air coming from the third duct into the first duct (and thus into the baking chamber) and directs the air coming from the second duct (and thus from the baking chamber) into the fourth duct. In its other position the valve directs the hot air coming from the third duct into the second duct and the air coming from the first duct into the fourth duct.

Thus, in this device the air always flows in one and the same direction through the heater, and the duct cross and the valve are fairly simple in their construction. However, a serious disadvantage resides in the fact that the duct cross is very bulky and makes it very difficult, if not entirely impossible, to dispose two or more baking chambers heated by a common heater side by side in one and the same oven.

The object of the invention is to provide a baking oven of the type indicated wherein the direction of flow of the air can be reversed in the or each baking chamber with the direction of flow unchanged at the heater and without resorting to complicated means.

According to the invention there is provided a baking oven of the type indicated wherein the air is circulated in a closed path comprising a heater, a plenum chamber, a side chamber outside the one sidewall of the or each baking chamber, the or each baking chamber, a side chamber outside the other sidewall of the or each baking chamber, and a suction chamber, and wherein the communication of the plenum chamber and the suction chamber with the side chambers being controlled by means of a two-position valve, which in its one position communicates the plenum chamber with the one side chamber and communicates the other side chamber with the suction chamber and in its other position communicates the plenum chamber with the said other side chamber and communicates the said one side chamber with the suction chamber. The valve comprises for each baking chamber two valve sections, which are secured to a common rotatable shaft extending along the rear wall of the baking chamber or chambers and are mutually alike but angularly displaced with respect to each other. If the oven has more than one baking chamber adjacent baking chambers conveniently have one valve section in common.

In a preferred embodiment each valve section is constituted by two rectangular, flat plates which are secured along the one of their longer sides to the shaft in axial planes at right angles to each other, the plates of adjacent valve sections being coplanar in pairs but extending tangentially outwardly from the shaft in opposite directions.

One embodiment of the invention will now be described, by way of example, with reference to the accompanying drawing, in which.

Figure 1:
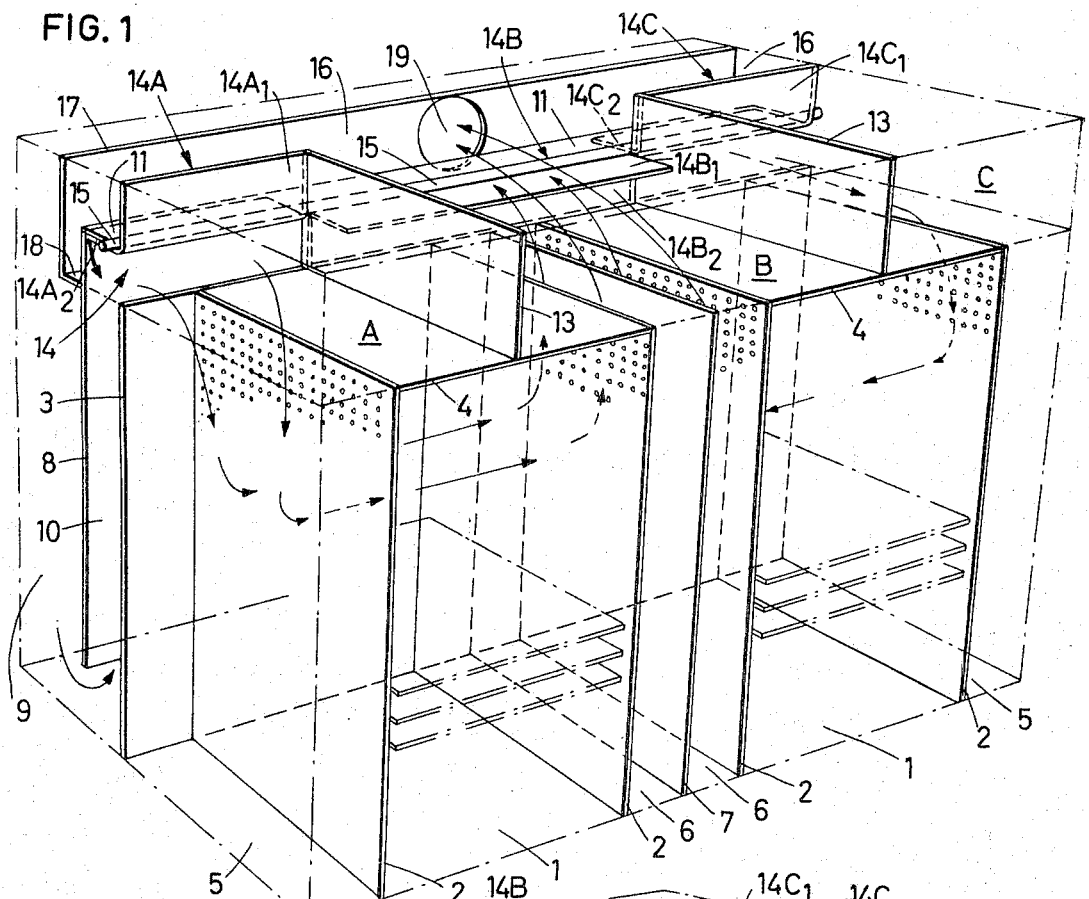
FIGURE 1 is a perspective view of a baking oven having two baking chambers, the insulation and casing of the oven being omitted for clarity.

The structure shown on the drawing is bounded in all directions by a casing which is not shown but comprises two spaced, substantially flat walls with a heat insulation therebetween. The innercorners of the casing are indicated in chain-dotted lines.

The baking oven illustrated has two parallelepipedal baking chambers 1 in which the dough pieces lie on baking plates during the baking. A few baking plates are indicated in chain-dotted lines in FIGURE 1. The baking oven shown is of the type having baking chambers into which a carriage or rack, in which the baking plates are stacked, can be shoved. After they have been moulded the dough pieces are placed on the baking plates in the carriage or rack which is then inserted into a fermenting room. After the fermentation the carriage or rack is shoved into one of the baking chambers for baking of the dough pieces.

Each baking chamber 1 is bounded on the sides by perforated side-walls 2, towards the back by a flat plate 3 extending over the width of the oven, at the top by a flat plate 4, at the bottom by the bottom of the casing and at the front by a door in the casing.

Outside the sidewalls 2 of each baking chamber 1 there is a chamber 5 and 6 respectively, hereinafter referred to as side chamber, which is open at the top and in communication with the baking chamber through the openings of the adjacent perforated sidewall 2. The two outer side chambers 5 are bounded on their outer sides by the inside of the casing sidewalls which cover the whole sides of the oven, whereas the inner side chambers 6 are separated by a partition 7.

Behind the back plate 3 there is a space which is divided by a partition 8 spaced from and parallel to the back plate. The partition 8 is laterally coextensive with the back plate 3 but has it lower edge spaced from the bottom of the casing. Thus the said space is divided into two compartments 9 and 10 communicating with each other at their lower ends. The hind compartment 9 houses a heat exchanger (not shown), and the fore compartment 10 forms an inlet or plenum chamber through which air heated by the heat exchanger flows upwardly and into one of the two side chambers 5 or 6 of each baking chamber 1 as will be described hereinafter.

The plenum chamber 10 is bounded at its upper end by a horizontal strip 11 which is coextensive with the back plate 3 and the partition 8 laterally of the oven. The strip 11 is situated at a slightly higher level than the horizontal upper surface of the baking chambers 1 and the side chambers 5, 6. The front edge of the strip 11 extends in or close to the vertical plane containing the rear upper corner of the baking chambers 1 and the side chambers 5, 6 as defined by the upper edge of the back plate 3. Thus the outlet of the plenum chamber 10 faces the space above and is situated higher than the upper surface of the baking chambers 1 and the side chambers 5, 6. The space above the baking chambers 1 and the side chambers 5, 6 is divided into three compartments A, B and C by means of two vertical partitions 13 extending between the vertical planes of the back plate 3 and the front side of the baking chambers 1 and the side chambers 5, 6. The partitions 13 are disposed half way between the side walls 2 and therefore the width of the middle compartment B is about twice that of each of the two outer compartments A and C.

The communication between the plenum chamber 10 and the compartments A, B and C is controlled by means of a two-position valve, generally designated 14, in such a manner that, depending on the actual position of the valve, either the outer compartments A and C only or the middle compartment B only is in free communication with the plenum chamber 10. The valve 14 comprises three sections 14A, 14B and 14C which are situated opposite to and are laterally coextensive with the compartments A, B and C respectively. The three valve sections 14A, 14B and 14C are secured (by welding, for example) to a horizontal shaft 15, which is rotated by means of an actuating mechanism (not shown) as will be explained later on. Each of the three valve sections 14A, 14B and 14C comprises two flat, rectangular plates $14A_1$ and $14A_2$, $14B_1$ and $14B_2$, $14C_1$ and $14C_2$ respectively. The two plates of each valve section are in right angles to each other and secured to the shaft 15 in such a manner that they extend tangentially outwardly therefrom. The plates $14A_1$ and $14C_1$ of the outer sections are coplanar with the plate $14B_2$ of the middle section but extend from the shaft 15 in the opposite direction, and the plates $14A_2$ and $14C_2$ of the outer sections are in the same plane, at right angles to the first mentioned plane, as the plate $14B_1$ of the middle section but extend outwardly from the shaft 15 in the opposite direction. Thus, as seen from one end the valve 14 forms a cross with the shaft 15 in one corner.

The valve shaft 15 extends about vertically above the upper edge of the back plate 3 and at the level of the strip 11. An actuating mechanism (not shown) is connected to the valve shaft to rock it intermittently through 90° at uniform intervals. Thus, the valve is in the position shown in FIGURE 1 for a predetermined period and is then rapidly rotated through 90° counterclockwise as seen from the left in FIGURE 1 to be rotated clockwise back to the position shown in FIGURE 1 after the same period.

The planes of the valve plates are horizontal and vertical respectively, and therefore one plate of each valve section is always horizontal whereas the other is vertical. When the valve 14 is in the position shown in FIGURE 1 the outlet of the plenum chamber 10 is open opposite to the two outer compartments A and C while it is closed opposite to the middle compartment B. Behind the valve 14 is an outlet or suction chamber 16 which is bounded, except by the casing of the oven, by a partition 17, 18 and the bounding strip 11 of the plenum chamber 10. The upper portion of the front side of the suction chamber 16 is in the same vertical plane as the outlet of the plenum chamber 10. Like the latter the suction chamber has no fixed bounding to the three compartments A, B and C. The partition 17, has an opening 19 forming the inlet to a fan (not shown) which continuously draws air from the suction chamber 16 which therefore is always at a subatmospheric pressure.

When the valve is in the position shown in FIGURE 1 the outlet of the plenum chamber 10 is open opposite to the two outer compartments A and C while the inlet of the suction chamber 16 is closed opposite to these compartments. At the same time the outlet of the plenum chamber is closed opposite to the middle compartment B while the inlet of the suction chamber is open opposite to this compartment. The air issuing from the fan, which passes through the heat exchanger in the compartment 9, then flows, as indicated by arrows, upwardly through the plenum chamber 10, through the outlet thereof into the compartments A and C and down into the two outer side chambers 5, through the openings in the outer sidewalls 2 of the baking chambers 1, between the baking plates in the baking chambers and into the two inner side chambers 6, into the portion of suction chamber 16 opposite to the middle compartment B and finally through the opening 19 and back to the fan.

Figure 2:
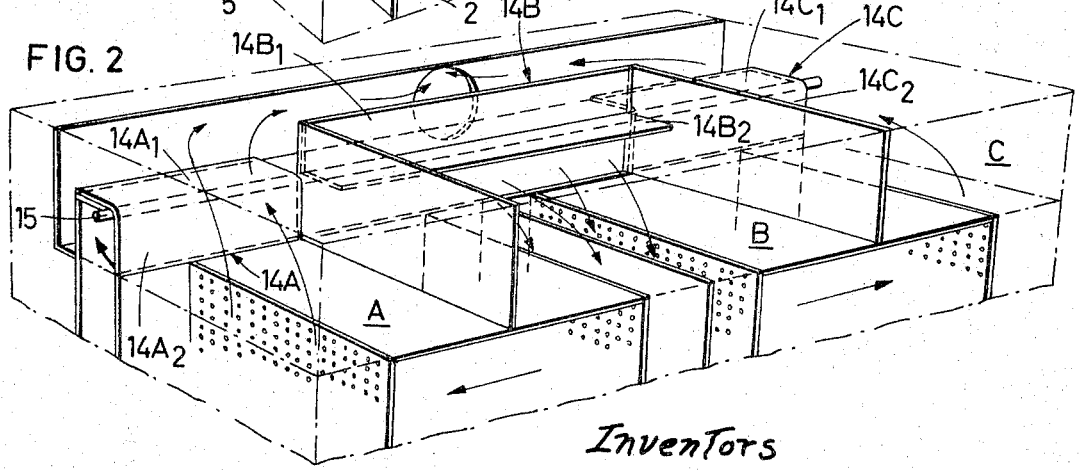
FIGURE 2 is a perspective view, corresponding to FIGURE 1, of the top portion of the oven, the direction of air flow in the baking chambers being opposite to that in FIGURE 1.

When the valve 14 has occupied the position shown in FIGURE 1 for a predetermined period, e.g. one or two minutes, it is rapidly rotated, by means of the actuating mechanism not shown, to the position shown in FIGURE 2. Then the air flow, as indicated by arrows, through the portion of the outlet of the plenum chamber 10 opposite to the middle section B, down into the two inner side chambers 6, through the baking chambers 1, into the two outer side chambers 5, through the portion of the suction chamber 16 opposite to the two outer sections A and C and back to the fan.

From the foregoing it will be clear that the circulating hot air is induced, by means of the valve 14, to pass horizontally through the baking chambers 1 alternately in opposite directions without reversing the direction of flow at the heat exchanger. Therefore, the latter can be used with the highest efficiency, and it is also ensured that the air is at the same temperature when it passes into the baking chamber, irrespective of the direction of flow.

As will be appreciated, certain changes or modifications can be made without departing from the spirit and scope of the invention as defined by the appended claims.

What we claim is:

1. A baking oven heated by circulating hot air and having one or more parallelepipedal baking chambers disposed side by side, in which oven the air is circulated in a closed path comprising a heater, a plenum chamber, a side chamber outside the one sidewall of the or each baking chamber, the or each baking chamber, a side chamber outside the other sidewall of the or each baking chamber, and a suction chamber, the communication of the plenum chamber and the suction chamber with the side chambers being controlled by means of a two-position valve, which in its one position communicates the plenum chamber with the one side chamber and communicates the other side chamber with the suction chamber and in its other position communicates the plenum chamber with the said other side chamber and communicates the said one side chamber with the suction chamber, the valve comprising for each baking chamber two valve sections which are secured to a common rotatable shaft extending along the rear wall of the baking chamber or chambers and are mutually alike but angularly displaced with respect to each other.

2. A baking oven as claimed in claim 1, having two or more baking chambers, wherein adjacent baking chambers have one valve section in common.

3. A baking oven as claimed in claim 1 or 2, wherein each valve section is constituted by two rectangular flat plates which along the one of their longer sides are secured to the shaft in axial planes at right angles to each other, the plates of adjacent valve sections being coplanar in pairs but extending tangentially outwardly from the shaft in opposite directions.

References Cited
UNITED STATES PATENTS

| | | | |
|---|---|---|---|
| 1,136,493 | 4/1915 | Stasek | 107—55 |
| 2,961,976 | 11/1960 | Ooms | 107—63 |

FOREIGN PATENTS 1,360,505 3/1964 France.

WALTER A. SCHEEL, *Primary Examiner.*

J. SHEA, *Assistant Examiner.*